United States Patent
Kuo et al.

(10) Patent No.: US 9,053,649 B2
(45) Date of Patent: Jun. 9, 2015

(54) BACKLIGHTMODULE, ASSEMBLY METHOD AND ASSEMBLY FIXTURE FOR BACKLIGHTMODULE

(75) Inventors: Yi-cheng Kuo, Guandong (CN); Yu-chun Hsiao, Guandong (CN); Chengwen Que, Guandong (CN); Pangling Zhang, Guandong (CN); Dehua Li, Guandong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 228 days.

(21) Appl. No.: 13/582,998

(22) PCT Filed: Aug. 8, 2012

(86) PCT No.: PCT/CN2012/079823
§ 371 (c)(1),
(2), (4) Date: Dec. 24, 2012

(87) PCT Pub. No.: WO2014/019245
PCT Pub. Date: Feb. 6, 2014

(65) Prior Publication Data
US 2014/0036476 A1    Feb. 6, 2014

(30) Foreign Application Priority Data
Jul. 31, 2012    (CN) .......................... 2012 1 0269119

(51) Int. Cl.
G09F 13/04    (2006.01)
B25H 1/00    (2006.01)
G02F 1/1333    (2006.01)
G02F 1/1335    (2006.01)

(52) U.S. Cl.
CPC ........ G09F 13/0413 (2013.01); *Y10T 29/49002* (2015.01); B25H 1/00 (2013.01); G02F 1/133308 (2013.01); G02F 1/133608 (2013.01); *G02F 2001/133314* (2013.01); *G02F 2001/133328* (2013.01)

(58) Field of Classification Search
CPC ........................................... G02F 2001/133328
USPC ............................... 362/632–634; 349/58–63
See application file for complete search history.

(56) References Cited

U.S. PATENT DOCUMENTS

| | | | |
|---|---|---|---|
| 5,654,779 A * | 8/1997 | Nakayama et al. | 349/58 |
| 7,116,386 B2 * | 10/2006 | Lee et al. | 349/58 |
| 7,481,567 B2 * | 1/2009 | Cho et al. | 362/632 |
| 7,515,221 B2 * | 4/2009 | Jeon | 349/58 |
| 7,883,252 B2 * | 2/2011 | Matsui et al. | 362/612 |
| 8,284,548 B2 * | 10/2012 | Takechi | 361/679.22 |
| 8,292,489 B2 * | 10/2012 | Chiu et al. | 362/634 |

(Continued)

Primary Examiner — Y M Lee
(74) Attorney, Agent, or Firm — Andrew C. Cheng

(57) ABSTRACT

The present invention provides a backlight module, assembly method and assembly fixture for backlight module. The backlight module comprises an optical component set and a back plate. Optical component set is disposed in a stacked manner, the back plate comprises at least two independent back plate elements for clamping respectively at least a side wall of the optical component set. Each back plate element comprises a top wall, a bottom wall and a side wall connecting the top wall and the bottom wall. Each back plate element is assembled onto an optical component set from a side and clamping the optical component set with the top wall and the bottom wall of the back plate element. The assembly of the back plate can be performed on an assembly fixture to improve the assembly efficiency of backlight module.

6 Claims, 3 Drawing Sheets

(56) References Cited

U.S. PATENT DOCUMENTS

| | | | |
|---|---|---|---|
| 8,830,418 B2* | 9/2014 | Kuo et al. | 349/58 |
| 2009/0097277 A1* | 4/2009 | Iwasaki | 362/628 |
| 2010/0067185 A1* | 3/2010 | Liou | 361/679.21 |
| 2011/0103092 A1* | 5/2011 | Matsui | 362/612 |
| 2011/0292317 A1* | 12/2011 | Kim et al. | 349/61 |
| 2013/0182459 A1* | 7/2013 | Chou | 362/633 |
| 2013/0201421 A1* | 8/2013 | Yu | 349/58 |
| 2013/0258717 A1* | 10/2013 | Hur et al. | 362/613 |
| 2014/0002767 A1* | 1/2014 | Chen et al. | 349/60 |

* cited by examiner

BACKLIGHTMODULE, ASSEMBLY METHOD AND ASSEMBLY FIXTURE FOR BACKLIGHTMODULE

BACKGROUND OF THE INVENTION

1. Field of the Invention

The present invention relates to a backlight module, assembly method and assembly fixture for backlight module.

2. The Related Arts

A liquid crystal module comprises a backlight module, a liquid crystal panel and a front frame. The liquid crystal panel and the backlight module are stacked and fastened by the front frame.

The backlight module comprises back plate, optical components, light source and mold frame. The back plate, optical components, light source and mold frame are assembled in a stacked order. The optical components are fastened by the back plate and the mold frame. The above assembly method is often executed manually and is inefficient.

SUMMARY OF THE INVENTION

The technical issue to be addressed by the present invention is to provide a backlight module, assembly method and assembly fixture for backlight module with higher assembly efficiency.

The present invention provides a backlight module, which comprises; an optical component set, a back plate and an connecting mechanism; the optical component set being disposed in a stacked manner, the back plate comprising at least two independent back plate elements for clamping respectively at least a side wall of the optical component set, each back plate element comprising a top wall, a bottom wall and a side wall connecting the top wall and the bottom wall, the bottom wall comprising a bump part facing the top wall, the optical component set being clamped by the top wall and the bottom wall of the back plate elements, the bump part contacting the optical component set; the back plate elements being connected through connecting mechanism.

According to a preferred embodiment of the present invention, the back plate comprises four back plate elements, and each back plate element clamps on a side of the optical component set.

According to a preferred embodiment of the present invention, the adjacent back plate elements partially overlap, and the overlapping position is connected through connecting mechanism.

According to a preferred embodiment of the present invention, the connecting mechanism is a screw.

The present invention provides an assembly method for backlight module, the backlight module comprises an optical component set and a back plate having at least two independent back plate elements, with each back plate element comprising a top wall, a bottom wall and a side wall connecting the top wall and the bottom wall; the assembly method for backlight module comprises: stacking components of an optical component set along a first direction; pushing back plate elements along a second direction perpendicular to the first direction so that the top wall and the bottom wall of the back plate element clamping the optical component set.

According to a preferred embodiment of the present invention, the bottom wall comprises a bump part facing the top wall, and in the step of pushing back plate elements along a second direction perpendicular to the first direction so that the top wall and the bottom wall of the back plate element clamping the optical component set, the bump part contacts the optical component set.

According to a preferred embodiment of the present invention, the assembly method for backlight module further comprises: connect the at least two back plate elements.

According to a preferred embodiment of the present invention, the back plate comprises four back plate elements.

According to a preferred embodiment of the present invention, the adjacent back plate elements partially overlap, and the overlapping position is connected through connecting mechanism.

According to a preferred embodiment of the present invention, the connecting mechanism is a screw.

The present invention provides an assembly fixture for backlight module, the backlight module comprises an optical component set and a back plate having at least two independent back plate elements, with each back plate element comprising a top wall, a bottom wall and a side wall connecting the top wall and the bottom wall; the assembly fixture for backlight module comprises: an assembly platform and a movable platform; the assembly platform is for carrying an optical component set stacked along a first direction, and the movable platform is for carrying the back plate elements and able to move back plate elements along a second direction perpendicular to the first direction so that the top wall and the bottom wall of the back plate element can clamp on the optical component set.

According to a preferred embodiment of the present invention, the assembly platform comprises a fixed part, a movable part and a resilient connecting part for resiliently connecting the fixed part and the movable part; the fixed part is for supporting center area of the optical component set, and the movable part is for supporting peripheral area of the optical component set and able to move towards the fixed part when pushed by the movable platform.

According to a preferred embodiment of the present invention, the movable platform comprises a carrying part and a restricting part; the carrying part carries the back plate elements and the restricting part stops the back plate elements from moving away from the optical component set; during the movable platform moving towards the assembly platform, the carrying part pushes movable part towards the fixed part.

According to a preferred embodiment of the present invention, the assembly fixture further comprises a fastening mechanism, for connecting the at least two back plate elements through a connecting mechanism.

According to a preferred embodiment of the present invention, the fastening mechanism is an auto-lock screw mechanism, the connecting mechanism is a screw, and the auto-lock screw mechanism uses screw to tighten and lock overlapping part of the adjacent back plate elements.

The efficacy of the present invention is that to be distinguished from the state of the art. The back plate of the present invention comprises at least two independent back plate elements, each back plate element is assembled onto an optical component set from a side and clamping the optical component set with the top wall and the bottom wall of the back plate element. The assembly of the back plate can be performed on an assembly fixture to improve the assembly efficiency of backlight module.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

The following description refers to drawings and embodiments of the present invention.

Figure 1:
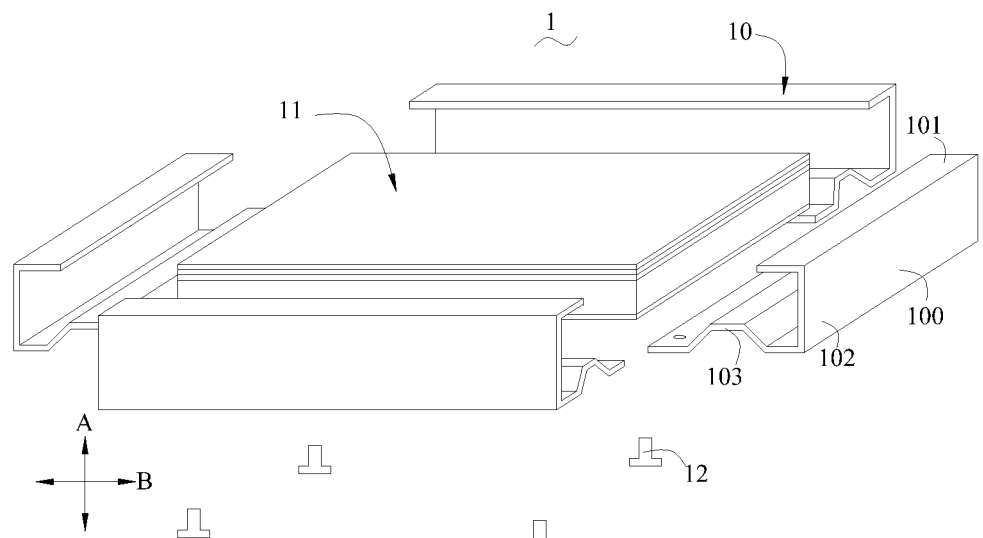
FIG. 1 is a schematic view showing the dissected structure of a backlight module according to the present invention.
Figure 2A:
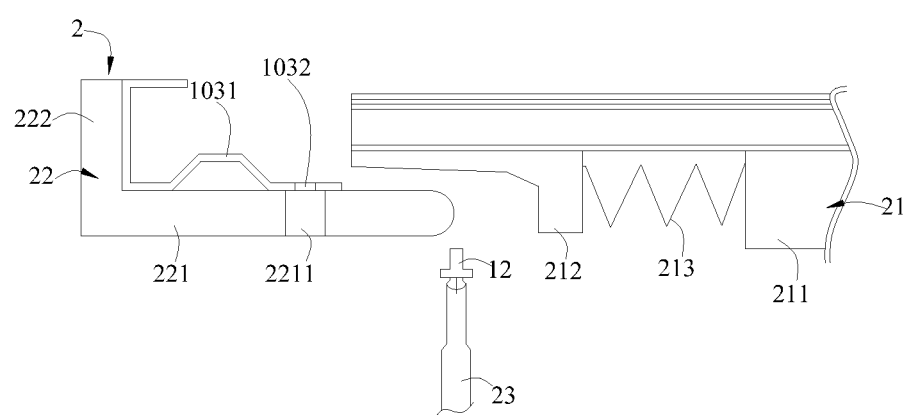
FIGS. 2A-2D show the assembly process of assembling the backlight module with the assembly fixture according to the present invention.
Figure 2B:
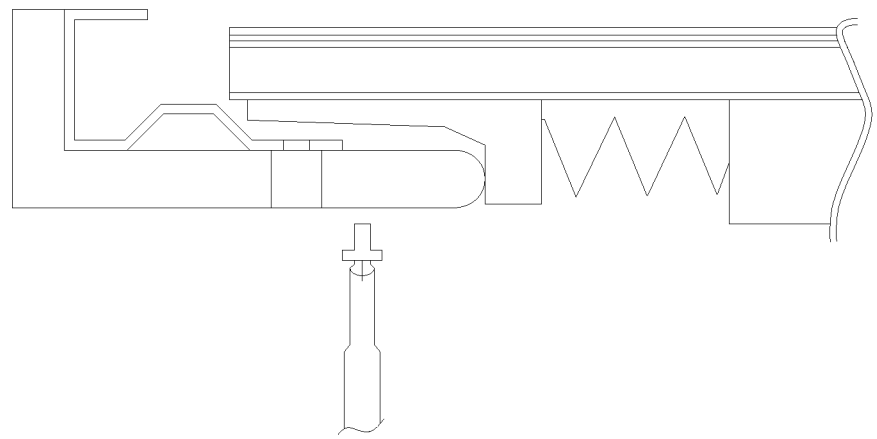
Figure 2C:
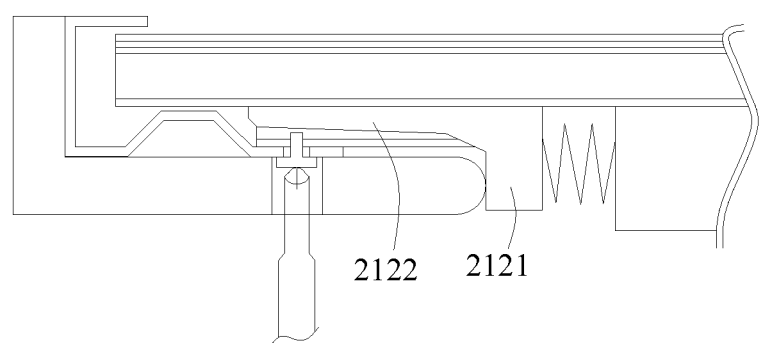
Figure 2D:
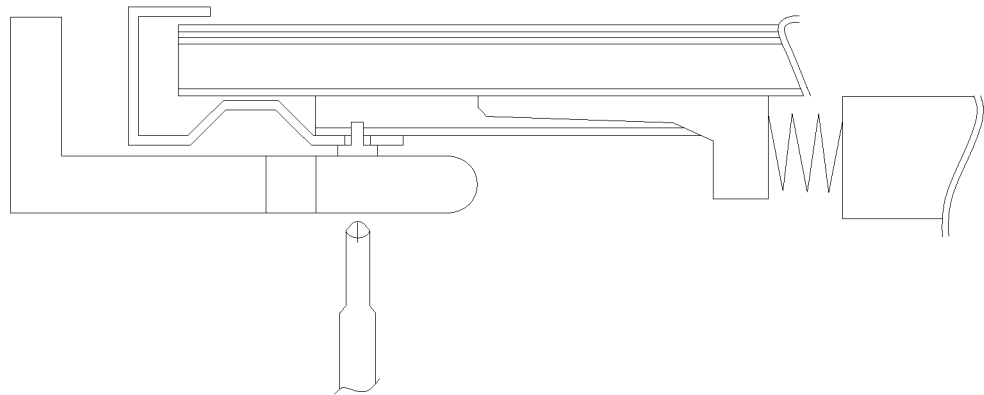

Referring to FIG. 1, a backlight module 1 comprises an optical component set 11 and a back plate 10. Optical component set 11 is stacked along a first direction A, wherein the first direction A is the vertical direction. Back plate 10 comprises at least two back plate elements 100, for clamping respectively on at least a side of optical component set 11.

Each back plate element 100 comprises a top wall 101, a bottom wall 103 and a side wall 102 connecting top wall 101 and bottom wall 103. Top wall 101 and bottom wall 103 clamp on optical component set 11. For convenient assembly and better clamping on optical component set 11 by top wall 101 and bottom wall 103, bottom wall 103 is disposed with a bump part 1031 facing top wall 101. In actual application, top wall 101 can also be disposed with a bump part (not shown) facing bottom wall 103; alternatively, bump part 1031 can be disposed only on top wall 101, but not on bottom wall 103.

In the instant embodiment, back plate 10 comprises four bar-shaped back plate elements 100. Each back plate element 100 clamps on edge of a side of optical component set 11. Also referring to FIG. 2, backlight module 1 further comprises a connecting mechanism for connecting overlapping part of two adjacent back plate elements 100. For example, back plate element 100 is disposed with screw hole 1032 at overlapping part. With screw 12, two back plate elements 100 are connected. Screw 12 is an embodiment of connecting mechanism.

In addition to the instant embodiment, back plate 11 can also comprise at least two bar-shape back plate elements 100, two L-shaped back plate elements, or bar-shape and L-shaped back plate elements.

Connection between back plate elements 100 can be, but not limited to, connection between two adjacent back plate elements 100. When non-adjacent back plate elements are connected, the connecting mechanism can further comprise other necessary auxiliary mechanism, such as, connecting board (not shown). Through connecting mechanism, the connection among all elements of backlight module 1 is more enhanced.

Refer to FIGS. 2A-2D. The present invention further provides an assembly fixture 2 for backlight module 1. Assembly fixture 2 comprises an assembly platform 21, a movable platform 22 and a fastening mechanism 23. Assembly platform 21 is for carrying optical component set 11 stacked along a first direction A. Movable platform 22 is for carrying back plate elements 100 and able to move back plate elements 100 along a second direction B perpendicular to first direction A so that top wall 101 and bottom wall 103 of back plate element 100 can clamp on optical component set 11. Second direction B is the horizontal direction. Fastening mechanism 23 is for connecting two back plate elements 100 through connecting mechanism 12.

To prevent bottom component of optical component set 11 from bending downwards to interfere during assembling back plate elements 100 to reduce yield rate, in addition to a fixed part 211, assembly platform 21 further comprises a movable part 212 and a resilient connecting part 213 for resiliently connecting the fixed part 211 and the movable part 212. Fixed part 211 is for supporting center area of the optical component set 11, and movable part 212 is for supporting peripheral area of the optical component set 11 and able to move towards fixed part 211 when pushed by movable platform 22.

Movable part 212 comprises connecting part 2121 and support part 2122. Connecting part 2121 is resiliently connected to fixed part 211, and support part 2122 auxiliary supports peripheral area of optical component set 11. During movable platform 22 moving towards assembly platform 21, carrying part 221 slides under bottom of support part 2122 and pushes connecting part 2121 to make movable part 212 move towards fixed part 211.

In actual application, number of movable parts 212 resiliently connected to fixed part 211 is usually the same as number of back plate elements 100. For example, when back plate comprises four back plate elements 100, assembly platform 21 comprises four resilient connecting parts and four movable parts connected to corresponding resilient connecting parts. For better efficiency of assembly fixture 2 for backlight module 1, number of movable platform 22 is also equal to number of back plate elements 100. Movable platform 22 carries back plate element 100 and is disposed respectively at location corresponding to edge of optical component set 11 to be clamped.

Each movable platform 22 comprises a carrying part 221 and a restricting part 222. Carrying part 221 carries the back plate elements 100 and restricting part 222 stops back plate elements 100 from moving away from optical component set 11. During movable platform 22 moving towards assembly platform 21, carrying part 221 pushes movable part 212 of assembly platform 21 towards fixed part 211. Resilient connecting part 213 is compressed. Carrying part 221 is disposed with via hole 2211 at location corresponding to screw hole 1032 on back plate element 100 for fastening mechanism 23 to pass and connect two back plate elements.

In the instant embodiment, fastening mechanism 23 is an auto-lock screw mechanism to make overlapping part of adjacent back plate elements adopting connecting mechanism 12 to tighten and lock.

Figure 3:
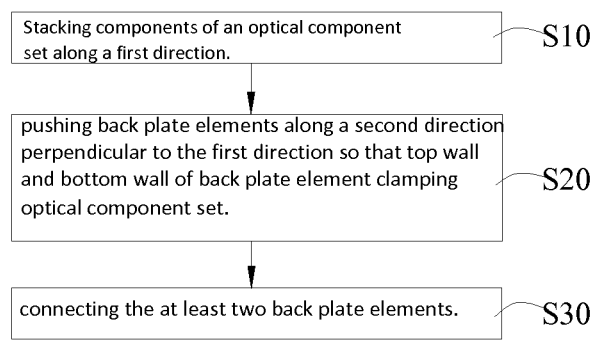
FIG. 3 is a flowchart of the assembly method for backlight module according to the present invention.

Referring to FIG. 3, FIG. 3 is a flowchart of the assembly method for backlight module 1 with assembly fixture 2 according to the present invention. The assembly method comprises the following steps.

Step S10: stacking components of an optical component set 11 along a first direction A.

In this step, the stacking of optical component set 11 is manually performed, without buckling. Therefore, the efficiency will not be affected. The first direction A is the vertical direction. Optical component set 11 is stacked and placed on assembly platform 21.

Step S20: pushing back plate elements 100 along a second direction B perpendicular to the first direction A so that top wall 101 and bottom wall 103 of back plate element 100 clamping optical component set 11.

In this step, different back plate element 100 is carried by respective movable platform 22. Second direction B is the horizontal direction perpendicular to the first direction A. Take four bar-shaped back plate elements 100 forming back plate 10 as an example. Four back plate elements 100 are carried by respective movable platforms 22, with adjacent movable platforms 22 forming a 90°. Movable platforms 22 can be pushed simultaneously or sequentially to make each back plate element 100 clamping on a different edge of optical component set 11. In the instant embodiment, top wall 101 of back plate element 100 contacts resiliently top surface of optical component set 11, and bottom wall 103 of back plate element 100 contacts resiliently bottom surface of optical component set 11. When bottom wall 103 is disposed with bump part 1031, bump part 1031 contacts resiliently bottom surface of optical component set 11.

The specific process of pushing back plate element 100 comprises: pushing movable platform 22 along second direction B and movable platform 22 carrying back plate element 100 to move along; carrying part 221 of movable platform 22 further sliding under bottom of support part 2122 of movable part 212 and pushing connecting part 2121 moving towards fixed part 21; top wall 101 and bottom wall 103 of back plate element 100 closing in optical component set 11 and resiliently contacting top surface and bottom surface of optical component set 11 so as to clamp on edge of optical component set 11.

Step S30: connecting the at least two back plate elements 100.

When back plate elements 100 are assembled, fastening mechanism 23 pushes connecting mechanism 12 upwards to pass through via hole 2211 of movable platform 22 to connect adjacent back plate elements 100 through connecting mechanism 12.

In comparison with the known technique, the back plate 10 of backlight module 11 of the present invention comprises at least two independent back plate elements 100, each back plate element 100 is assembled onto an optical component set 11 from a side and clamping the optical component set 11 with the top wall 101 and the bottom wall 103 of the back plate element 100. The assembly of the back plate 10 can be performed on an assembly fixture 2 to improve the assembly efficiency of backlight module 1.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. An assembly fixture for backlight module, the backlight module comprises an optical component set and a back plate having at least two independent back plate elements, with each back plate element comprising a top wall, a bottom wall and a side wall connecting the top wall and the bottom wall; the assembly fixture for backlight module comprises: an assembly platform and a movable platform; the assembly platform is for carrying an optical component set stacked along a first direction, and the movable platform is for carrying the back plate elements and able to move back plate elements along a second direction perpendicular to the first direction so that the top wall and the bottom wall of the back plate element can clamp on the optical component set; the assembly platform comprises a fixed part, a movable part and a resilient connecting part for resiliently connecting the fixed part and the movable part; the fixed part is for supporting center area of the optical component set, and the movable part is for supporting peripheral area of the optical component set and able to move towards the fixed part when pushed by the movable platform.

2. The assembly fixture for backlight module as claimed in claim 1, characterized in that the movable platform comprises a carrying part and a restricting part; the carrying part carries the back plate elements and the restricting part stops the back plate elements from moving away from the optical component set; during the movable platform moving towards the assembly platform, the carrying part pushes movable part towards the fixed part.

3. The assembly fixture for backlight module as claimed in claim 2, characterized in that the assembly fixture further comprises a fastening mechanism, for connecting the at least two back plate elements through a connecting mechanism.

4. The assembly fixture for backlight module as claimed in claim 3, characterized in that the fastening mechanism is an auto-lock screw mechanism, the connecting mechanism is a screw, and the auto-lock screw mechanism uses screw to tighten and lock overlapping part of the adjacent back plate elements.

5. A assembly method for backlight module using the assembly fixture
as claimed in claim 1, the assembly method for backlight module comprises:
staking components of the optical component set on the assembly platform along the first direction, whereby the fixed part of the assembly platform supporting center area of the optical component set and the movable part supporting peripheral area of the optical component set;
carrying the back plate element by the movable platform;
pushing the movable platform carried with the back plate element along the second direction so that the movable part of the assembly platform is pushed by the movable platform to move toward the fixed part, and thereby the back plate element clamping on an edge of a side of the optical component set and the top wall and the bottom wall of the back plate element respectively resiliently contacting a top surface and a bottom surface of the optical component set.

6. The assembly method for backlight module as claimed in claim 5, characterized in that the assembly method for backlight module further comprises:
connecting the at least two back plate elements.

* * * * *